A. A. EWALD.
GASKET FOR INFLATION TUBE CONNECTIONS.
APPLICATION FILED JULY 1, 1919.
1,344,028.
Patented June 22, 1920.
2 SHEETS—SHEET 1.
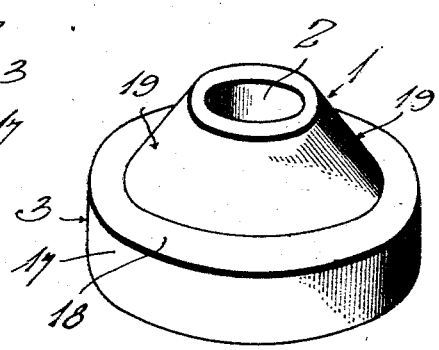
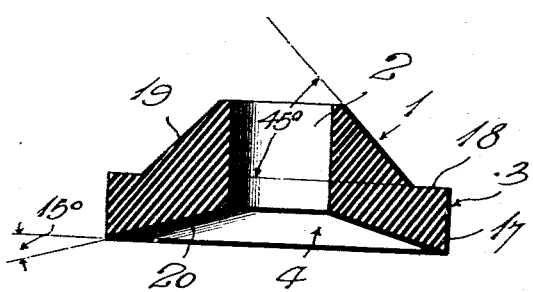
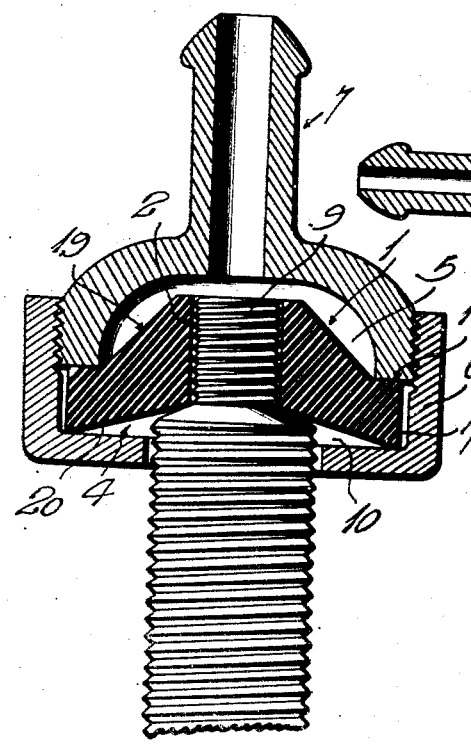
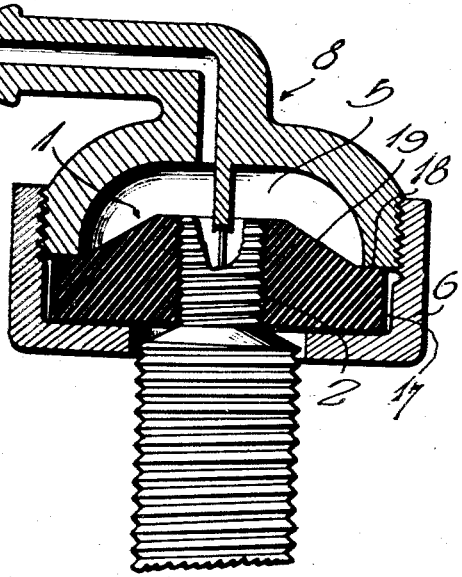
Witness
H. Woodard
Inventor
A. A. Ewald
By H. B. Wilson &co
Attorneys A. A. EWALD.
GASKET FOR INFLATION TUBE CONNECTIONS.
APPLICATION FILED JULY 1, 1919.
1,344,028.
Patented June 22, 1920.
2 SHEETS—SHEET 2.
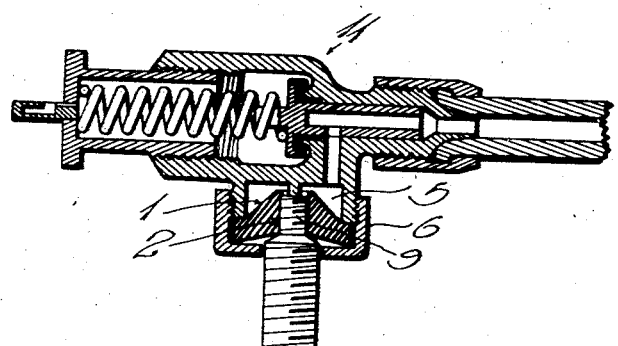
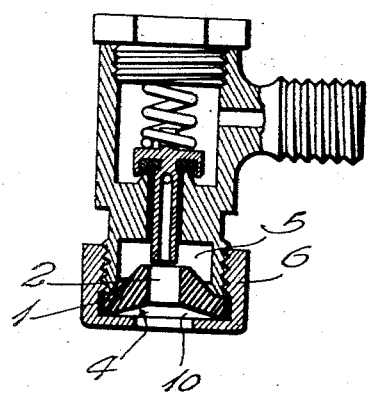
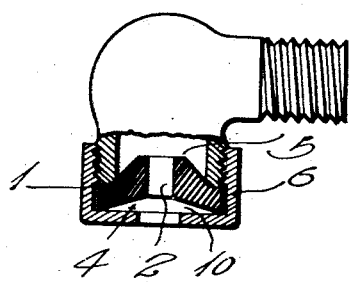
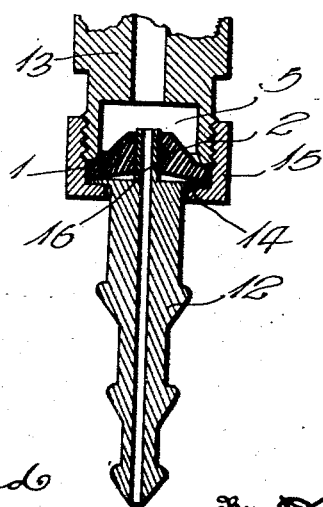
Witness
H. Woodard
Inventor
A. A. Ewald
By H. B. Williamson
Attorneys

UNITED STATES PATENT OFFICE.

ARNO A. EWALD, OF OAKFIELD, WISCONSIN.

GASKET FOR INFLATION-TUBE CONNECTIONS.

1,344,028.

Specification of Letters Patent.  Patented June 22, 1920.

Application filed July 1, 1919. Serial No. 307,903.

*To all whom it may concern:*

Be it known that I, ARNO A. EWALD, a citizen of the United States, residing at Oakfield, in the county of Fond du Lac and State of Wisconsin, have invented certain new and useful Improvements in Gaskets for Inflation-Tube Connections; and I do declare the following to be a full, clear, and exact description of the invention, such as will enable others skilled in the art to which it appertains to make and use the same.

This invention relates to improvements in hose connections with special reference to automatic and non-automatic coupling devices used in connecting the hose of an air pump or pressure tank with the inflation valve of pneumatic tires and with like nipples, and the invention relates more specifically to an improvement in the gasket employed in such valves or couplings to establish an air tight connection between them and the inflation nipple.

One object of the invention is to provide a gasket of a specially designed shape which will be distorted by the air pressure and contracted tightly around the valve or other nipple in such a manner as to form a fluid tight connection and tightly hold against blowing off.

Another object is the provision of an improved gasket which will be more efficient in use and easier of application and removal, than those now commonly used.

Yet another object is to construct the gasket in such form as to avoid any likelihood of its undue distortion or reversal when the coupling or valve in which it is contained is removed or pulled off from the tire valve or the like.

With the foregoing in view, the invention resides in the novel construction of the gasket hereinafter described and claimed, and illustrated in the accompanying drawings.

Figure 1 is a perspective view of a gasket constructed in accordance with my invention.

Fig. 2 is a sectional view cut in line with the axis of the gasket.

Figs. 3, 4, 5, 6, 7 and 8 are sectional views showing the application of the gasket to different forms of well known inflation valves and other connections.

In carrying out my invention, I provide a one-piece frusto-conical body 1 formed with an axial opening 2 to receive the tire valve or like nipple, the base of said body being extended beyond the tapered side thereof to provide an annular external rib 3 for clamping the gasket in place. The base is cupped from its peripheral edge to the opening 2 for the purpose of allowing the gasket to yield from its apex toward its base, under the pressure of the inflating fluid, thus snugly contracting the opening 2 around the valve or other nipple, in such manner as to form a fluid tight connection and to prevent liability of the coupling or the like in which the gasket is used, blowing from the valve or nipple.

The gasket is intended for use in all sorts of valves, couplings and other connections used with tubes or hoses through which a fluid is forced for inflating tires, air bags and analogous members. All of such valves, couplings and the like are provided with a pressure cavity 5 into which the conical body 1 extends, and with a ring nut 6 for clamping the gasket in place against the portion of the valve or the like around said cavity, and although I have illustrated several different types of inflation connections, it is to be understood that the gasket is not restricted to use in connection with these devices only. In Fig. 3 I have shown a straight pump connection 7 and in Fig. 4 an angle pump connection 8, and in the first named figure I have illustrated the normal condition of the gasket before the air pressure is turned on, while in Fig. 4, the distorted shape of the gasket is illustrated, this distortion being due to the air pressure acting upon the conical side of the gasket. By reference to Fig. 3, it will be seen that the gasket may be easily passed over the nipple 9 of a tire valve or the like and that the cup 4 in its base will assist in guiding said nipple into the opening 2. A considerable space then exists between the wall of the cup and the ring nut 6 as indicated at 10. When the pressure is turned on however as indicated in Fig. 4, the gasket is distorted from its apex toward its base, practically eliminating the space 10 and snugly contracting the opening 2 around the nipple 9. This forms a fluid tight connection and prevents any liability of the connection blowing from the valve or the like. However, when the pressure is cut off, the gasket returns to its original form, due to the elasticity of the rubber or other elastic material of which it is constructed, and consequently the connection may be easily removed from the valve or other nipple without allowing the threads thereof to mutilate the wall of the opening, as now occurs with devices of the present day type.

Fig. 5 shows the application of the gasket to a well known form of automatic, pressure relief, inflation valve; and Figs. 6 and 8 illustrate the application of the device to other well known forms of automatic inflation valves, and the action of the gasket in all of these valves is the same as above described.

In Fig. 7 I have shown a neck 12 designed for attaching another hose or the like to the discharge end of any of the inflation valves or connections above referred to, one of such valves or connections being illustrated at 13. The neck 12 is provided with a flange 14 engaged by the ring nut 15 which is threaded on the member 13, and the inner end of said neck is provided with a nipple 16. One of the gaskets may be used in this connection with its rib 3 gripped between the ring nut and the connection 13, the opening 2 receiving the nipple 16. By this arrangement, when the air pressure passes through the connection, it will act in the cavity 5 on the gasket to contract the latter tightly around the nipple 16 to prevent any possibility of escape of pressure.

In the preferred embodiment of my invention, reference being made particularly to Figs. 1 and 2, the peripheral edge 17 of the rib 3 is parallel with the axis of the opening 2 and the side 18 of said rib toward the apex of the body 1, is at right angles to said axis; the tapered side 19 of the body 1 is disposed at an angle of forty-five degrees to the plane of the side 18 of the rib 3; and the wall 20 of the cup 4 is disposed at an angle of fifteen degrees to the plane in which the base of the gasket is located. I have referred to forty-five degrees and fifteen degrees, but obviously slight deviations may be made, and although the exact proportions shown are preferably followed, they might well be varied in some instances. Under very severe tests, the gasket has proven highly efficient, long lived, proof against reversal or turning inside out when removing from a tire valve or the like, and much more easily applied and removed than the ordinary devices now commonly used, and since the proportions disclosed were followed in the gaskets with which these tests have been made, they will in most cases be used, as their merit has been proven.

I claim:

1. A gasket for inflation tube connections comprising a frusto-conical body formed of elastic material and provided with an axial opening to receive a tire valve or like nipple, the base of said frusto-conical body being extended beyond the tapered side thereof to provide an annular external rib for clamping the gasket in place, said base being cupped from its peripheral edge to said opening to allow yielding of the gasket from its apex toward its base under the pressure of the inflating fluid, whereby to contract said opening around the nipple in a fluid tight manner.

2. A structure as specified in claim 1; the peripheral edge of said rib being parallel with the axis of said opening and the side of said rib toward the apex of the frusto-conical body being at right angles to said axis; the tapered side of said body being disposed at substantially forty-five degrees to the plane of said side of the rib; the wall of the cup in said base being disposed at substantially fifteen degrees to the plane of said base.

In testimony whereof I have hereunto set my hand.

ARNO A. EWALD.